United States Patent [19]
Janssens et al.

[11] Patent Number: 5,573,995
[45] Date of Patent: Nov. 12, 1996

[54] METHOD FOR MAKING AN IMAGE USING A DIRECT THERMAL IMAGING ELEMENT

[75] Inventors: Robert Janssens, Geel; David Tilemans, Lier, both of Belgium

[73] Assignee: Agfa-Gevaert, Mortsel, Belgium

[21] Appl. No.: 227,445

[22] Filed: Apr. 14, 1994

[30] Foreign Application Priority Data

Apr. 27, 1993 [EP] European Pat. Off. .............. 93201206

[51] Int. Cl.$^6$ .................................................. B41M 5/26
[52] U.S. Cl. ........................ 503/201; 503/202; 503/212
[58] Field of Search .......................... 427/150; 430/200, 430/212; 503/202, 216, 217, 225, 201, 212

[56] References Cited

U.S. PATENT DOCUMENTS 3,951,660  4/1976  Hagemann et al. .................. 96/67

FOREIGN PATENT DOCUMENTS 0599369  6/1984  European Pat. Off. .............. 503/202
94/14618  7/1994  WIPO ................................... 503/202

*Primary Examiner*—B. Hamilton Hess
*Attorney, Agent, or Firm*—Richard J. Birch

[57] ABSTRACT

A method for making an image using a direct thermal imaging element, comprising on a support a thermosensitive layer incorporating an organic silver salt and a reducing agent contained in said thermosensitive layer and/or in other optional layers, said imaging element being imagewise heated by means of a thermal head having energisable heating elements, characterised in that the activation of the heating elements is executed line by line with a line duty cycle $\Delta$ representing the ratio of activation time to total line time, such that the following equation is satisfied $$P \leq P_{max} 3.3 \ W/mm^2 + (9.5 \ W/mm^2 \times \Delta)$$

wherein $P_{max}$ is the maximal value over all heating elements of the time averaged power density P dissipated by a heating element during a line time.

5 Claims, 6 Drawing Sheets

METHOD FOR MAKING AN IMAGE USING A DIRECT THERMAL IMAGING ELEMENT

FIELD OF THE INVENTION

The present invention relates to a recording method for direct thermal imaging.

BACKGROUND OF THE INVENTION

Thermal imaging or thermography is a recording process wherein images are generated by the use of imagewise modulated thermal energy. Thermography is concerned with materials which are not photosensitive, but are sensitive to heat or thermosensitive and wherein imagewise applied heat is sufficient to bring about a visible change in a thermosensitive imaging material, by a chemical or a physical process which changes the optical density.

Most of the direct thermographic recording materials are of the chemical type. On heating to a certain conversion temperature, an irreversible chemical reaction takes place and a coloured image is produced.

In direct thermal printing, said heating of the recording material may be originating from the image signals which are converted to electric pulses and then through a driver circuit selectively transferred to a thermal printhead. The thermal head consists of microscopic heat resistor elements, which convert the electrical energy into heat via the Joule effect. The electric pulses thus converted into thermal signals manifest themselves as heat transferred to the surface of the thermal paper Wherein, the chemical reaction resulting in colour development takes place. This principle is described in "Handbook of Imaging Materials" (edited by Arthur S. Diamond—Diamond Research Corporation —Ventura, Calif., printed by Marcel Dekker, Inc. 270 Madison Avenue, New York, ed 1991, p. 498–499).

A particular interesting direct thermal imaging element uses an organic silver salt in combination with a reducing agent. Such combination may be imaged by a suitable heat source such as e.g. a thermal head, laser etc. A black and white image can be obtained with such a material because under the influence of heat the silver ions are developed to metallic silver.

However, when imaged with a thermal head it appears to be difficult to obtain a neutral black tone image. For this purpose it has been suggested to add toning agents, but these still do not yield satisfactory results. Furthermore, it appears to be difficult to obtain a desired number of grey levels which may be required for some application, in particular if the image is to be used for medical diagnostic purposes.

On the other hand, other applications may require only dense black image on a white background. Such applications are those in which only line-art is to be reproduced e.g. bar code printing, facsimile hard copy generation etc. These applications generally require a neutral black image of high density.

OBJECTS OF THE INVENTION

Accordingly it is an object of the present invention to provide a recording method for making an image using a direct thermal imaging element, comprising on a support a thermosensitive layer containing an organic silver salt that is imagewise heated by means of a thermal head having energisable heating elements, which method yields improved tone neutrality in the printed images.

Further objects and advantages will become apparent from the description given hereinbelow.

SUMMARY OF THE INVENTION

We now have found that the above mentioned objects can be achieved by providing a method for making an image using a direct thermal imaging element, comprising on a support a thermosensitive layer containing an organic silver salt and a reducing agent contained in said thermosensitive layer and/or other optional layers, said imaging element being imagewise heated by means of a thermal head having energisable heating elements, characterised in that the activation of the heating elements is executed line by line with a line duty cycle $\Delta$ representing the ratio of activation time to total line time, such that the following equation is satisfied $$P \leq P_{max} = 3.3 \ W/mm^2 + (9.5. \ W/mm^2 \times \Delta)$$

wherein $P_{max}$ is the maximal value over all heating elements of the time averaged power density P (expressed in $W/mm^2$) dissipated by a heating element during a line time.

Further preferred embodiments are set forth in the detailed description given hereinafter.

DETAILED DESCRIPTION OF THE INVENTION

BRIEF DESCRIPTION OF THE DRAWINGS

The invention will be described with reference to the accompanying drawings in which.

Table 1 is a survey of extended experiments according to the present invention and containing a comparative example.

Figure 1:
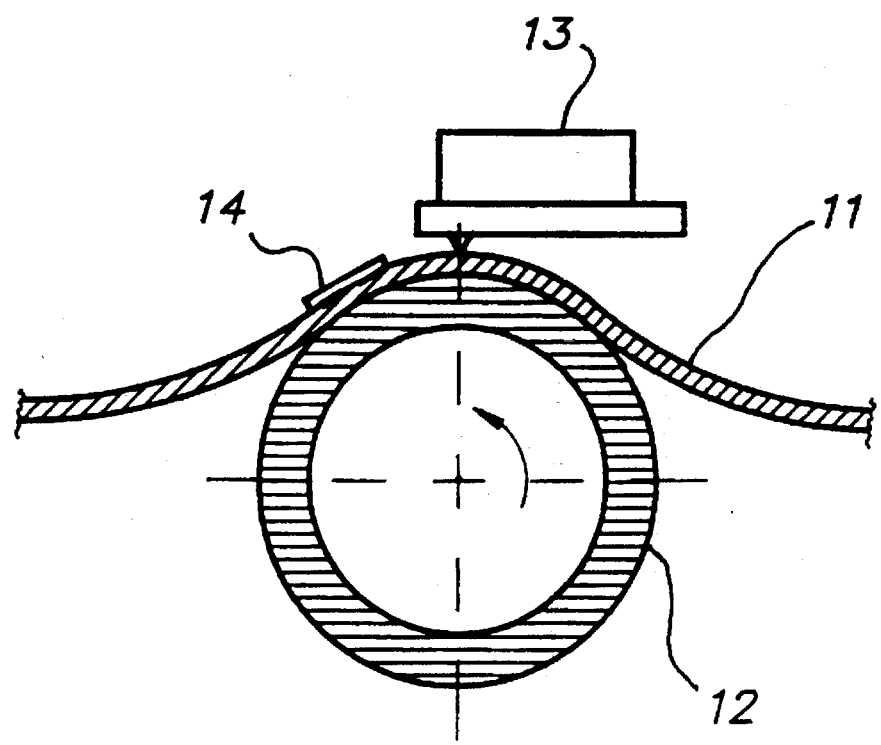
FIG. 1 is a schematic crosssectional view of a direct thermal printer.

Referring to FIG. 1, there is shown a global principle scheme of a thermal printing apparatus that can be used in accordance with the present invention and which is capable to print a line of pixels at a time on a recording material 11, comprising on a support a thermosensitive layer containing an organic silver salt, which generally is in the form of a sheet. The recording material 11 is secured to a rotatable drum 12, driven by a drive mechanism (not shown) which continuously advances the drum 12 and the recording sheet 11 past a stationary thermal head 13. This head 13 presses the recording material 11 against the drum 12 and receives the output of the driver circuits. The thermal head 13 normally includes a plurality of heating elements equal in number to the number of pixels in the image data present in a line memory. The imagewise heating of the heating element is performed on a line by line basis, the "line" may be horizontal or vertical depending on the configuration of the printer, with the heating resistors geometrically juxtaposed each along another and with gradual construction of the output density. Each of these resistors is capable of being energised by heating pulses, the energy of which is controlled in accordance with the required density of the corresponding picture element. As the image input data have a higher value, the output energy increases and so the optical density of the hardcopy image 14 on the recording sheet 11. On the contrary, lower density image data cause the heating energy to be decreased, giving a lighter picture 14.

Figure 2:
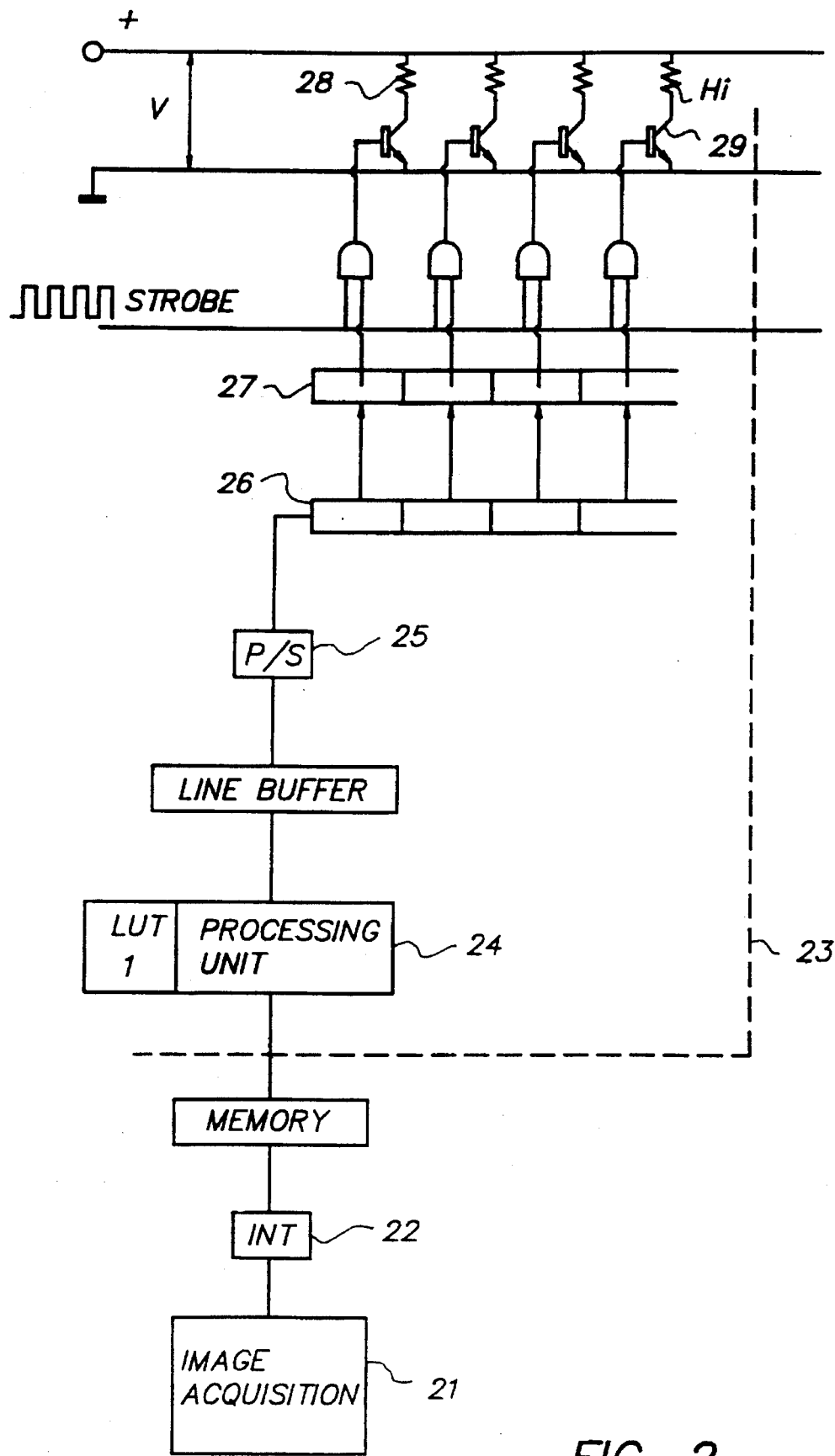
FIG. 2 is a data flowdiagram of a direct thermal printer.

The different processing steps are illustrated in the diagram of FIG. 2. First a digital signal representation is obtained in an image acquisition apparatus 21. Then, the digital image signal is applied via a digital interface 22 and a first storing means. (indicated as "MEMORY" in FIG. 2) to a recording unit or printer 23. In the recording unit 23 the digital image signal may first be processed 24, including a data conversion e.g. for relating the optical densities in function of the input data. Next the recording head (13 in FIG. 1) is controlled so as to produce in each pixel the density value corresponding with the processed digital image signal value 24. After processing 24 and parallel to serial conversion 25 of the digital image signals, a stream of serial data of bits is shifted into another storing means, e.g. a shift register 26, representing the next line of data that is to be printed. Thereafter, under controlled conditions, these bits are supplied in parallel to the associated inputs of a latch register 27. Once the bits of data from the shift register 26 are stored in the latch register 27, another line of bits can be sequentially clocked into said shift register 26. As to the heating elements. 28, the upper terminals are connected to a positive voltage source (indicated as V in FIG. 2), while the lower terminals of the elements are respectively connected to the collectors of the driver transistors 29, whose emitters are grounded. These transistors 29 are selectively turned on by a high state signal (indicated as "STROBE" in FIG. 2) applied to their bases and allow current to flow through their associated heating elements 28. In this way a direct thermal hardcopy (14 in FIG. 1) of the electrical image data is recorded. By varying the heat applied by each heating element 28, a variable density image pixel is formed by the recording material 11.

Because the processing unit 24 is very important for the further disclosure of the present invention, special attention is now focused on it. As already mentioned before, the electrical image data are available at the input of 24. Said data are generally provided as binary pixel values, which are in proportion to the densities of the corresponding pixels in the original image. For a good understanding of said proportion, it is noted that an image signal matrix is a two dimensional array of quantised density values or image data $I(i,j)$ where i represents the pixel column location and j represents the pixel row location, or otherwise with i denoting the position across the head of the particular heating element and j denoting the line of the image to be printed. For example, an image with a 2880×2300 matrix will have 2880 columns and 2300 rows, thus 2880 pixels horizontally and 2300 pixels vertically. The output from said matrix is a string of pulses. corresponding to the density to be printed in each pixel, whereby the number of density values of each pixel to be reproduced is restricted by the number of bits pro pixel. For a K bit deep image matrix, individual pixels can have $N=2^K$ density values, ranging from 0 to $2^K-1$. If the matrix depth or pixel depth is 8 bits, the image can have up to $2^8$ or 256 density values.

More in particular, the image signal matrix to be printed is preferably directed to an electronic lookup table (indicated as LUT1 in 24) which correlates the quantised density values to the power dissipated during the strobe pulses to be used to drive each heating element 28 in the thermal printhead 13. Further, the activating pulses may be adapted by correlating each of the strings of pulses to density controlling methods, as will be described further on in the present application and in reference to FIGS. 10 and 11. The corrected pulses are then directed to the head driver 29 for energising the thermal heating elements 28 within the thermal head 13.

Before the invention is described in further detail, it is useful to illustrate (FIG. 3) the effect of feeding one activation pulse to a resistive heating element 28, showing the temperature on the vertical axis and the time on the horizontal axis. During said activation pulse the temperature of the resistive heating element, indicated as $T_e$, rises from e.g. 20° C. to 300° C., rising steeply at first and then more gradually. After the activation has been switched off, the resistive heating element cools at an even more gradual rate.

Figure 4:
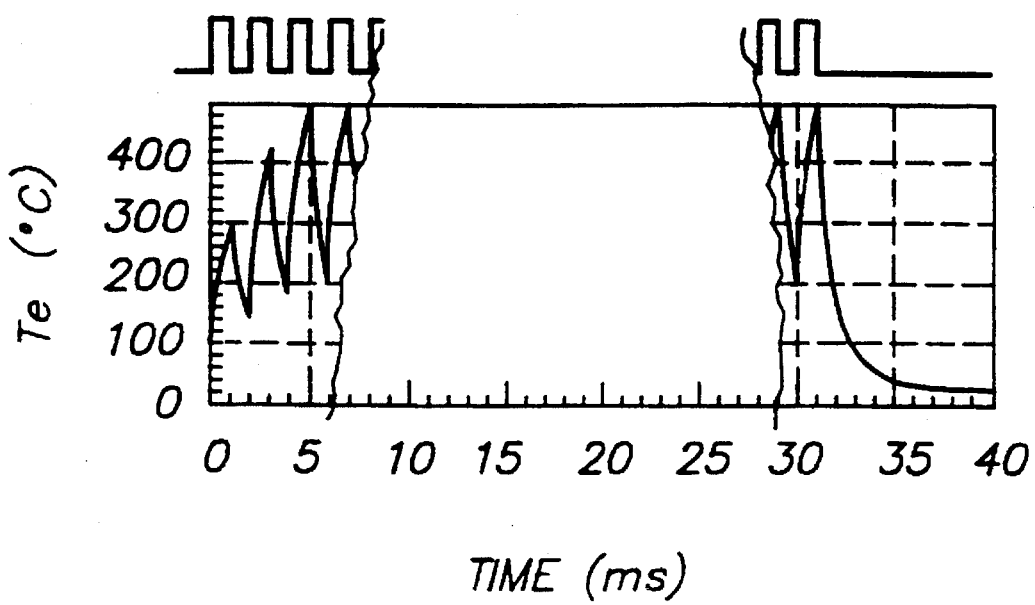
FIG. 4 is a graph illustrating heating and cooling when consecutive dots are printed.

FIG. 4 shows the effect of successive activation pulses. Because the resistive heating element cools more slowly than it heats, each successive pulse takes the resistive heating element from a higher starting temperature to a higher peak temperature, until possibly a saturation state is reached at a maximum peak temperature.

Figure 3:
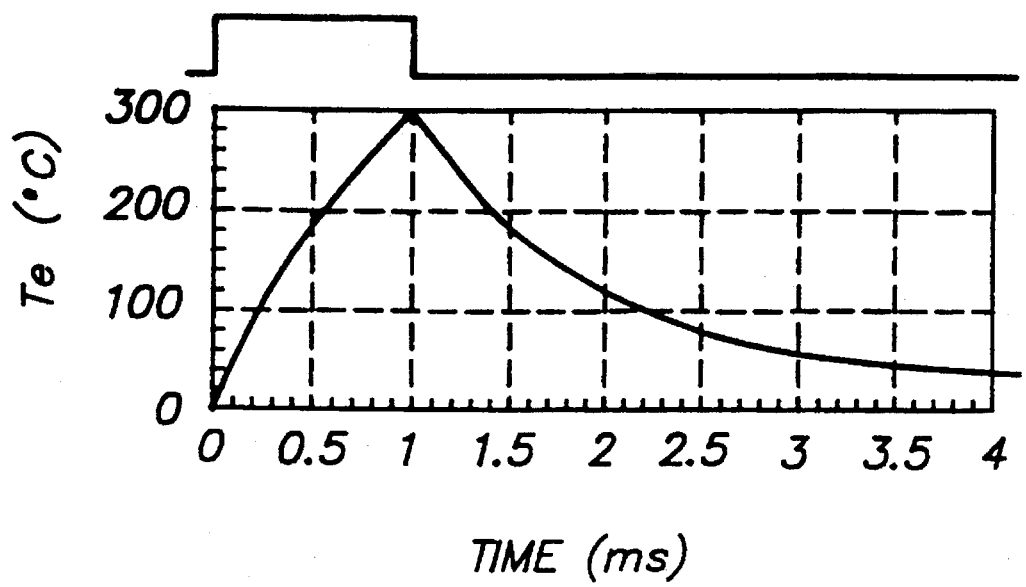
FIG. 3 is a graph of the heating and cooling curve of a heating element.

From said FIGS. 3 and 4, it may be easily seen that the temperature of the heating elements $T_e$, and hence also the resulting density in the printed image 14, may be influenced by controlling the activating pulses.

In printheads for direct thermal imaging the surface temperature may reach 300°–400° C., while the recording sheet contacts the printheads at pressures of 200°–500 g/cm² to ensure sufficient heat transfer.

Suitable thermal printing heads for use in thermographic recording are e.g. a Fujitsu Thermal Head FTP-040 MCS001, a TDK Thermal Head F415 HH7-1089, and a Rohm Thermal Head KE 2008-F3.

Hereinafter, the ratio of the total time of activation pulses to the total time available for printing a line, will be called "line duty cycle", indicated by Δ.

Figure 5:
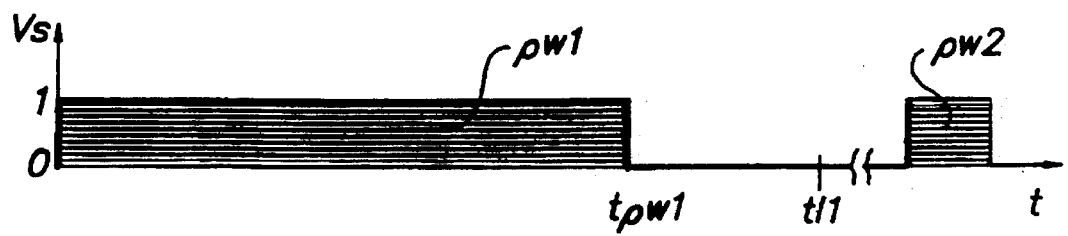
FIG. 5 is a chart illustrating principally the strobe pulse of a heating element in the case of pulse width activation.

In the case of pulse width activation (PW), said ratio Δ may directly be deducted from FIG. 5 as being $$\Delta = PW/t_1 \tag{1}$$

In the case of duty cycle activation (DC), which will be explained in greater depth in the next paragraphs and in reference to FIG. 6, said ratio Δ may be deducted by first summing up all heating pulses. (each indicated by the letter h) and then dividing the thus accumulated pulse times (Σh) by the total time ($t_1$) available for printing a line. In this case, formula [2] applies $$\Delta = PW/t_1 \tag{2}$$

Thus, in case of duty cycle activation, the activation time is taken as the total accumulated time of all heating pulses.

Figure 6:
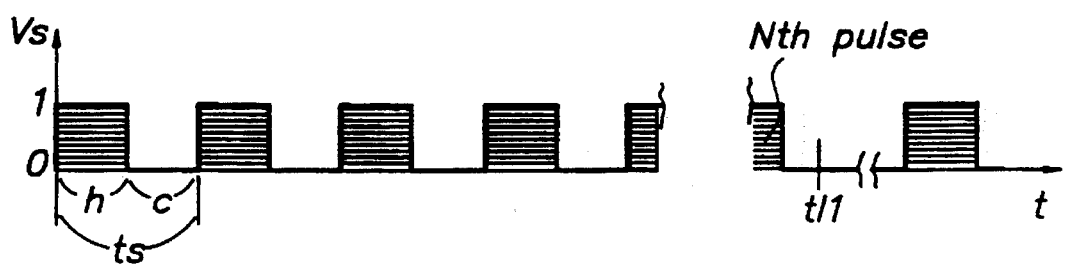
FIG. 6 is a chart illustrating principally the strobe pulses of a heating element in the case of duty cycle activation.

In order to explain the basic principles of "duty cycle pulsing DC", FIG. 6 shows the current pulses applied to a single heating element (refs. $H_i$ and 28 in FIG. 2). The repetition strobe period ($t_s$) consists of one heating cycle (h) and one cooling cycle (c) as indicated in the same FIG. 6. The strobe pulse width (h) is the time an enable strobe signal (ref STROBE in FIG. 2) is on. The "strobe duty cycle $\delta$" of a heating element is the ratio of the heating or strobe pulse width (h) to the repetition strobe period ($t_s$=h+c). So, formula [3] applies $$\delta = h/(h+c) \qquad [3]$$

According to a preferred embodiment of the present invention, in the case of duty cycle activation, the active strobe pulses begin from the start of the line time, as illustrated in FIG. 6, at least if any activation is present, which clearly results from at least a minimal density.

According to the present invention, said varying of the heat applied by each heating element 28, in order to provide a variable density image pixel in the recording material 11, without any undesirable colouring as e.g. a browning of the print, is carried out pulsewise, by pulse width (PW) or by duty cycle modulation (DC), such that $$P \leq P_{max} = 3.3 \ W/mm^2 + (9.5 \ W/mm^2 \times \Delta) \qquad [4]$$

Herein P is the time averaged power density dissipated during a line time by a heating element (expressed in $W/mm^2$) and $P_{max}$ is the maximal value over all heating elements of said time averaged power density P dissipated by a heating element, expressed in $W/mm^2$.

In a preferred embodiment of the present invention, with pulse width (PW) activation, said ratio $\Delta$ may directly be replaced by $\Delta=PW/t_1$ as given by formula [1] and which can be introduced in equation [4] in order to calculate $P_{max}$ and which restricts the average heating power density which actually may be applied in order to achieve the above mentioned objects.

According to a most preferred embodiment of the present invention, activation is carried out by duty cycle activation (DC). Said ratio a may then be derived from formula [2] being $\Delta=\Sigma(h)/t_1$ which can be introduced in equation [4] in order to calculate $P_{max}$ and which restricts the average heating power density which actually may be applied in order to achieve the above mentioned objects.

More in particular, the applied time averaged power in the case of DC activation, may be calculated from $$P = \Delta \times V^2/R \qquad [5]$$

wherein V is the amplitude of the voltage applied to the thermal head (in Volt), R is the electrical resistance of a heating element (in $\Omega$).

It will be clear from the above formulae [2 and 5] that the time averaged power density P may be adjusted by changing $\Delta$, which itself may be varied by changing the activation time and/or the line time, or P may also be adapted by changing the voltage. Some of these parameters may be changed during printing or may be optimised for a particular type of image. When parameters are changed during printing, they should be clanged such that the power density (P) averaged over the line time ($t_1$) satisfies equation [4]. Some of these possibilities will now be discussed.

According to the present invention, said strobe duty cycle $\delta$ may be a constant, or may be changed during the activation time. According to the present invention, adaptable duty cycle pulsing (ADC) may be carried out in several ways, a general survey of which is given in the next following paragraphs. In a printer in connection with the present invention, the strobe period ($t_s$=h+c) may be a constant or may be changed, e.g. by software programming, during the activation time. In another embodiment of a printer in connection with the present invention, the strobe period ($t_s$=h+c) preferably is a constant, but the pulse width (h) may be changed; so the duty cycle may be varied accordingly.

In still another embodiment of a printer in connection with the present invention, neither the strobe period, nor the strobe pulse width are constant; and both may be varied during activation.

After having explained the basic principles of ADC pulsing, now the practical implementation in several embodiments will be described, without the intention to limit the present invention thereto. Various modifications may be possible for those skilled in the art after receiving the teachings of the present disclosure, without departing from the scope thereof.

In a preferred embodiment of the present invention, the method for making an image using a direct thermal imaging element, the image wise heating by ADC pulsing is carried out line by line and the time for completing a line ($t_1$) may be optimised before making said image. Said optimisation is restricted by the restraints of the available time for making the complete image, the number of lines within the image, the cooling time necessary between two consecutive lines and the required quality of the printed image, as it relates to the colour and the number of densities. Generally, the line time will be in the order of milliseconds, e.g. between 10 and 50 ms, preferably between 15 and 35 ms.

Figure 7:
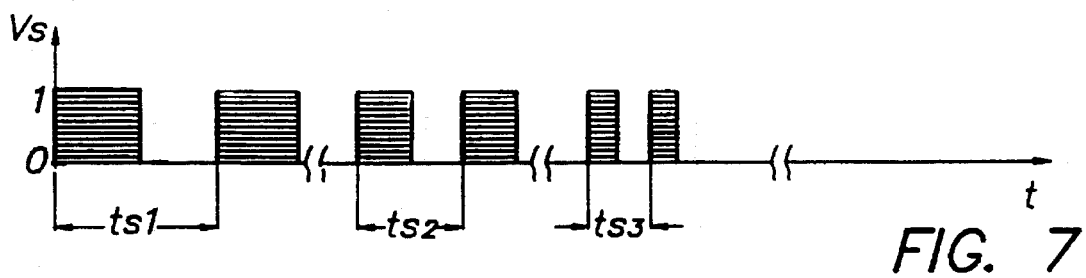
FIG. 7 is a chart illustrating principally the activating strobe pulses of a heating element with a decreasing strobe period and constant strobe duty cycle.

In a further preferred embodiment of the present invention, the method for making an image using a direct thermal imaging element, the imagewise heating is ca tied out adaptable duty cycled pulsewise with a strobe period ($t_s$), which may be optimised before activation of the heating elements. Said strobe period is preferably as large as possible, taking into consideration the exact kind of material and the exact kind of image. Said optimisation is however restricted by the restraints of the available line time for making a complete line and the number of density levels desired. Supposing that the maximal number of obtainable density values attains N levels, the line time ($t_1$) is divided in a number (N) of strobe pulses each with repetition strobe periods $t_s$ as indicated on FIG. 6. In the case of e.g. 256 density values., according to a 8 bits format of the corresponding electrical image signal values, the maximal heating time would be reached after 256 sequential strobe periods. FIG. 7 is a chart illustrating principally the activating strobe pulses of a heating element with a decreasing strobe period. Generally, the strobe period will be in the order of microseconds, e.g. between 5 and 50 µs, preferably between 5 and 20 µs.

Figure 8:
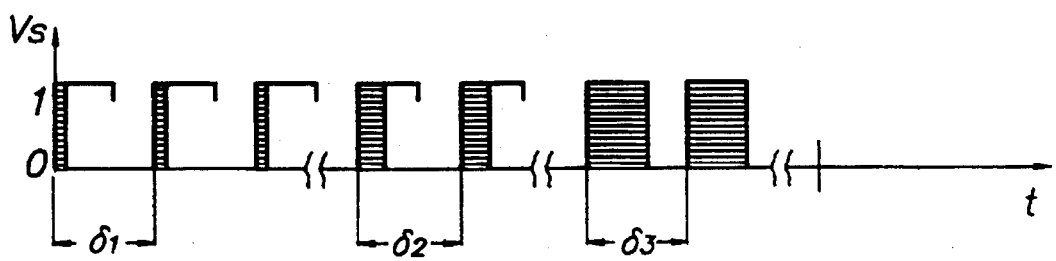
FIG. 8 is a chart illustrating principally the activating strobe pulses of a heating element with an increasing duty cycle and constant strobe period.

Alternatively, in a still further preferred embodiment of the present invention, the method for making an image using a direct thermal imaging element, the activation is optimised during the imagewise activation of the heating elements which may be realised by changing the strobe duty cycle $\delta$. FIG. 8 is a chart illustrating principally the activating strobe pulses of a heating element with an increasing duty cycle. Generally, the strobe duty cycle is between 30 and 100%, preferably between 50 and 95%.

Figure 9:
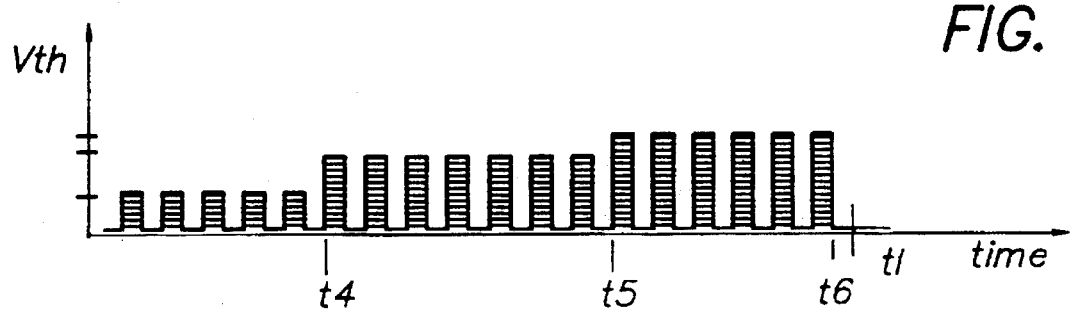
FIG. 9 is a chart illustrating principally the activating pulses of a heating element with an increasing amplitude and constant strobe duty cycle and constant strobe period.

In a further alternative embodiment of the present invention, the method for making an image using a direct thermal imaging element, the activation may be optimised during the imagewise activation of the heating elements by changing the activation voltage amplitude (V) within the above mentioned power density range according to equation [1]. Preferably, at the start of a line time a rather low voltage value may be used, in order to prevent any unwanted colouring of the printed image, and later on in the same line time an increased voltage may be used. FIG. 9 is a chart illustrating principally the activating pulses of a heating element with an increasing amplitude. Generally, the activation voltage will be in the order of 15 Volt, e.g. between 10 and 20 V, preferably between 12 and 17 V.

Figure 10:
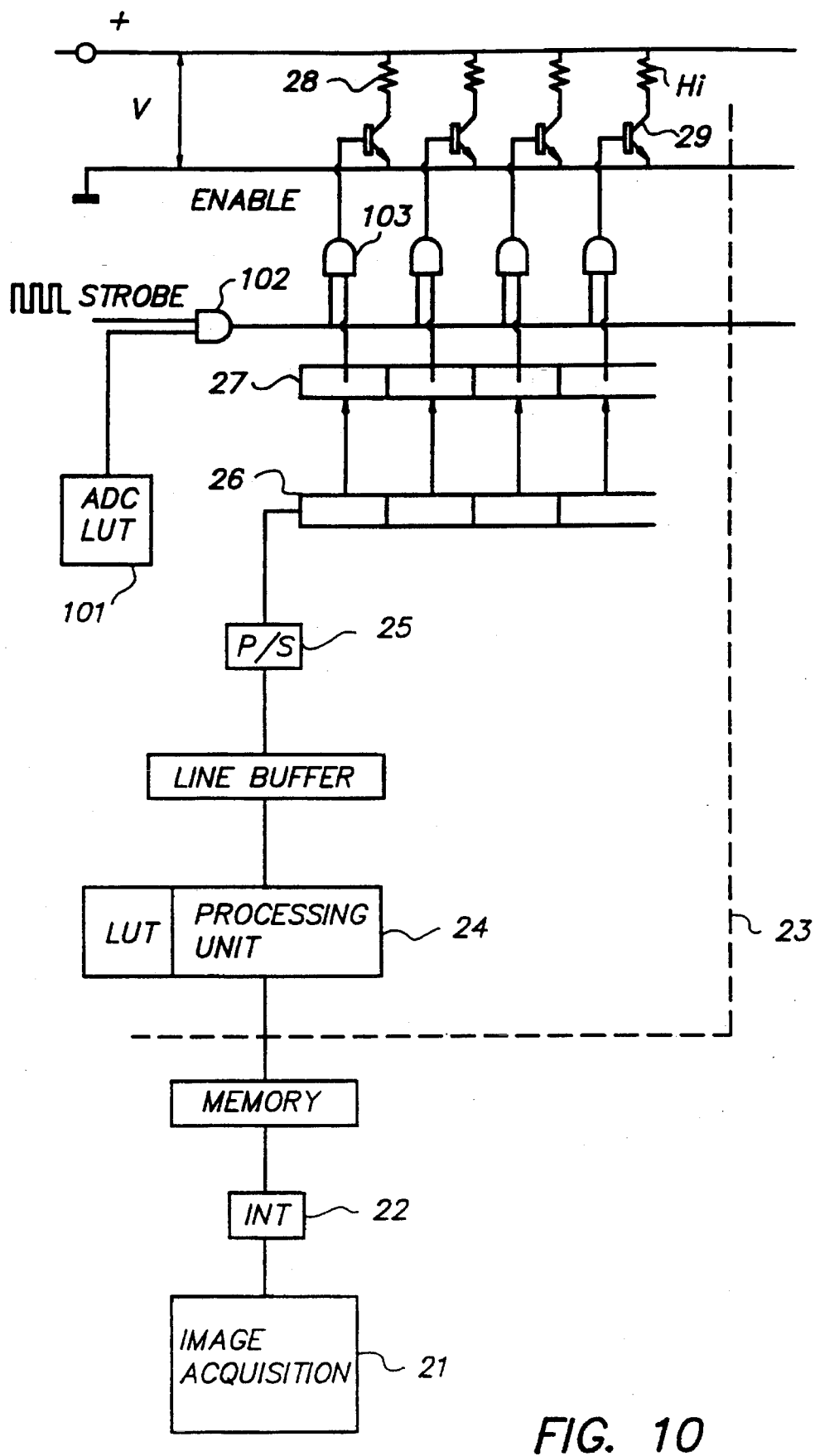
FIG. 10 is a preferred embodiment according to the present invention with adjustable strobe pulses.
Figure 11:
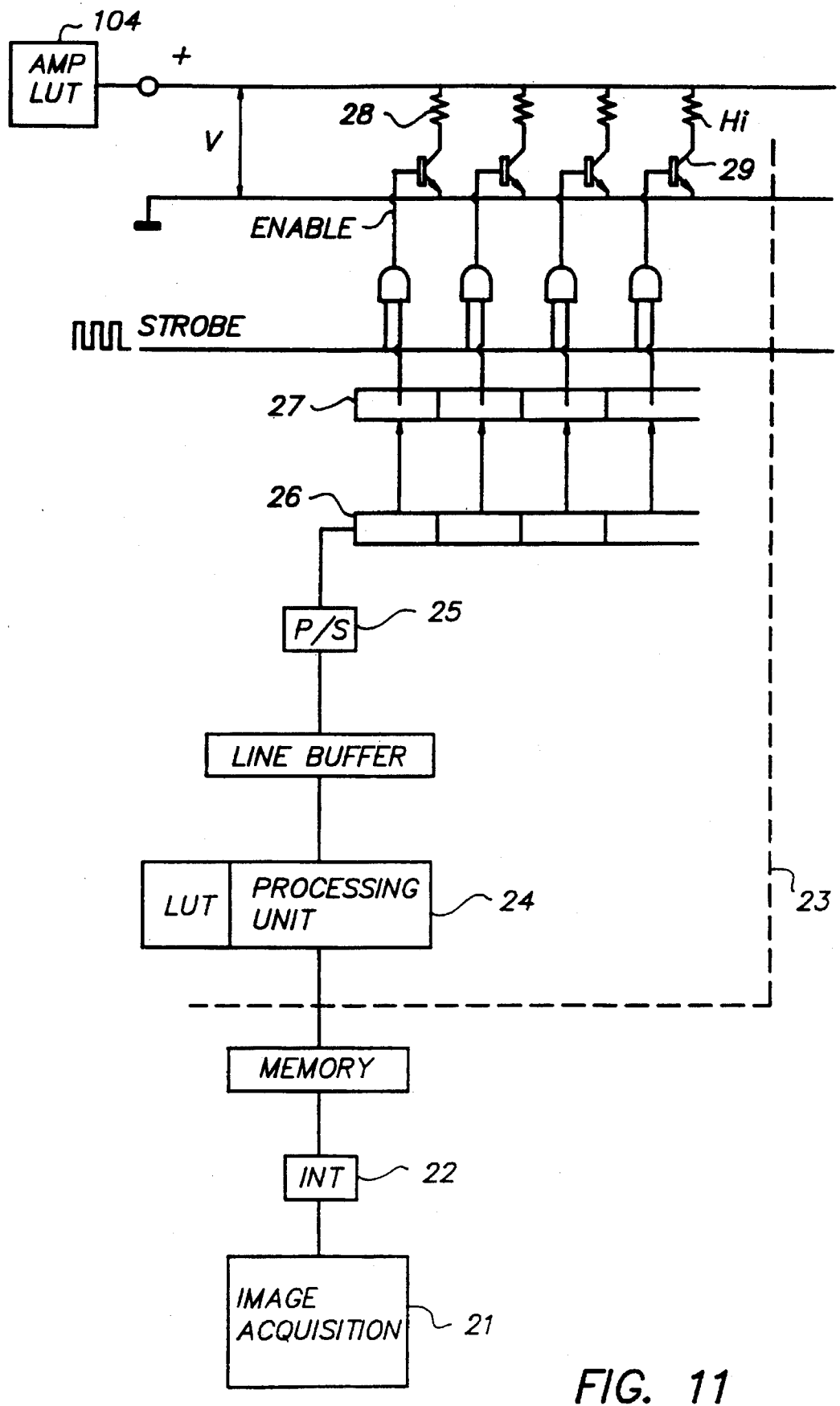
FIG. 11 is another preferred embodiment according to the present invention comprising adjustable amplitude of the activating pulses.

FIGS. 10 and 11 illustrate in more detail two preferred embodiments of the control circuit by which the heating elements 28 are energised. As the arrangement of FIG. 10 and 11 are quite similar to that of FIG. 2 and as like references constitute like parts, first given is a short description of the commons, afterwhich the detailed description can be restricted to the specific particularities of FIG. 10 and 11.

In FIG. 10 and in FIG. 11, adjustable activating pulses are applied to a single heating element 29 to form an image pixel. During a line time, an individual heating element is addressed a predetermined number (N) of times, N also representing the number of maximum possible density levels. In other words, there are N possible pulses in a line time cycle for each heating element (see also FIG. 6). Each time a heating element is addressed, only a single pulse can be applied to it. After all heating elements have been addressed once, the address process is repeated N−1 times until the line time cycle is completed. At this time, a line of image pixels having a particular density will have been printed.

Before explaining the particularities of FIG. 10 and FIG. 11 separately, we first understrike that, common to both embodiments, a relation of the activation power to the desired density levels may be implemented in the form of a lookup table, as it is in the next embodiments of the present invention. Both embodiments essentially differ from each other mainly by a difference in said relation.

In said LUT's each pixel value in the input image (ref 101 and 104) is mapped into the output image in such a way that each output pixel's value depends only on the value of the corresponding input pixel. In other words, instead of sending the digital image data (from 24) directly to the thermal head (ref 13 in FIG. 1), each pixel value will first be replaced by its corresponding LUT value. E.g. code 0 (00000000) gives the measured fog level; code 255 (11111111) gives the choosen Dmax; all other values follow a curve in between them.

As to one of our embodiments, said LUT's 101 and 104 define the printer so that a pixel value of zero corresponds with the minimum desired density value (e.g. in the range of 0 to 0.5 D) and the maximum pixel value (i.e.255) corresponds with the maximum desired density (e.g. in the range from 2.0 to 3.5 D), while all the pixel values in between correspond to a specified curve. After processing the electrical image signals with the aid of said LUT, according to the present invention, the required number and neutrality of the shades are effectively recorded.

The use of a specific LUT embodiment still brings also an additional advantage. While such a table consists of an ordered pair of input and output pixel values, incorporating the functional relationship of the specific transfer curve, the LUT is very efficient in performing repetitive operations. Indeed, rather than calculating the output pixel value from the input pixel value, the output value is directly retrieved from memory, which can save a significant amount of time.

In FIG. 10, a specific LUT 101, indicated as ADC LUT, possibly stores the width and the period of the strobepulses, and hence also the duty cycle, in relation to the different density levels. The output of said ADC LUT 101 is logically combined with the strobe pulses coming from a controlled clock pulse generator (not shown) in an AND gate 102.

The ANDED STROBE signal is fed to the AND gate 103, the output of which, indicated as ENABLE in FIG. 10, is high only if both inputs are high, thus enabling the transistors 29 to activate the heating resistors 28. The time during which the AND gate 103 is high clearly defines the width of the activation pulses.

By changing the "on time" of the STROBE signals (h), also the duration of the ENABLE signals is changed, and so the number of applied activation pulses is changed (FIG. 8), the frequency of these signals remaining unchanged.

In another approach, the frequency of the STROBE signals is increased during activation of the heating elements. This happens by changing the "period time" of the STROBE signals (h+c =$t_s$), as already illustrated before (FIG. 7).

In FIG. 11, each heating element is electrically connected to a nonconstant power supply and a specific LUT 104, indicated as AMP LUT, possibly stores the amplitude of the power supply, having a regulated voltage for activating the heating elements, in relation to the different density levels.

The direct thermal imaging material for use in the method of the present invention contains on a support a thermosensitive layer containing an organic silver salt and a reducing agent contained in said thermosensitive layer and/or other optional layers on said support. The organic silver salt will generaly be substantially light insensitive.

Substantially light-insensitive organic silver salts particularly suited for use according to the present invention in the thermosensitive layer are silver salts of aliphatic carboxylic acids known as fatty acids, wherein the aliphatic carbon chain has preferably at least 12 C-atoms, e.g. silver laurate, silver palmitate, silver stearate, silver hydroxystearate, silver oleate and silver behenate. Modified aliphatic carboxylic acids with thioether group as described e.g. in GB-P 1,111, 492 and other organic silver salts as described in GB-P 1,439,478, e.g. silver benzoate and silver phthalazinone, may be used likewise to produce a thermally developable silver image. Further are mentioned silver imidazolates and the substantially light-insensitive inorganicor organic silver salt complexes described in U.S. Pat. No. 4,260,677.

The reducing agent contained in the direct thermal imaging material is generally an organic reducing agent and will preferably be contained in the thermosensitive layer. A particular suitable type of reducing agents for use in the present invention are polyhydroxy spiro-bis-indanes as disclosed in EP-A-92203495.

The thermosensitive layer preferably also contains a binder. All kinds of natural, modified natural or synthetic resins may be used as binder, e.g. cellulose derivatives such as ethylcellulose, cellulose esters, carboxymethylcellulose, starch ethers, galactomannan, polymers derived from α, β-ethylenically unsaturated compounds such as polyvinyl chloride, after-chlorinated polyvinyl chloride, copolymers of vinyl chloride and vinylidene chloride, copolymers of vinyl chloride and vinyl acetate, polyvinyl acetate and partially hydrolyzed polyvinyl acetate, polyvinyl alcohol, polyvinyl acetals, e.g. polyvinyl butyral, copolymers of acrylonitrile and acrylamide, polyacrylic acid esters, polymethacrylic acid esters and polyethylene or mixtures thereof. A particularly suitable ecologically interesting (halogen-free) binder is polyvinyl butyral. Polyvinyl butyral containing some vinyl alcohol units is marketed under the trade name BUTVAR B79 of Monsanto USA.

The thickness of the thermosensitive recording layer will generally range from 4 µm to 16 µm. The direct thermal imaging material for use in the method of the present invention may also contain other ingredients for various purposes such as e.g. toning agents, antistatica, wetting agents, brighteners, ultraviolet absorbing agents etc . . .

The present invention will be illustrated by the following example without however the intention to limit the invention thereto. All parts are by weight unless otherwise specified.

EXAMPLE

A subbed polyethylene terephthalate support having a thickness of 100 μm was doctor blade-coated so as to obtain thereon after drying the following recording layer including:

| | |
|---|---|
| silver behenate | 4.42 g/m² |
| polyvinyl butyral | 4.42 g/m² |
| reducing agent | 0.84 g/m² |
| 3,4-dihydro-2,4-dioxo-1,3,2H-benzoxazine | 0.34 g/m² |
| silicone oil | 0.02 g/m² |

The reducing agent was a polyhydroxy spiro-bis-indane, viz. 3,3,3',3'-tetramethyl-5,6,5',6'-tetrahydroxy-spiro-bis-indane.

After drying said recording layer was coated at 22° C. at a wet coating thickness of 30 μm with the following coating composition for forming a protective layer.

| | |
|---|---|
| methyl ethyl ketone | 90 g |
| polycarbonate (see below) | 10 g |
| TEGOGLIDE (tradename) lubricant | 0.5 g |

The polycarbonate had the following structure: wherein x=55 mol % and y=45 mol %

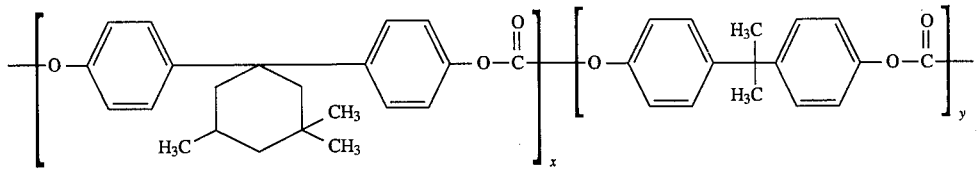

The thus coated layer was dried for 10 minutes in an air current at 50° C. whereby a protective scratch-resistant layer was obtained.

The obtained direct thermal imaging material was used in thermal printing with a thermal head having a plurality of heating elements. During printing the printhead was kept in contact with the slipping layer.

The heating elements were duty-cycled pulse-wise activated according to table 1. Herein, h/h+c representing the strobe duty cycle δ was set at 50%; further, DELTA represents the line duty cycle Δ and is the ratio of the activation time (Σh) to the linetime, $t_1$ represents the linetime, and $P_{max}$ represents the maximum time averaged power density calculated according to formula [4].

In table 1 is also listed the extent of colouring as determined from a visual inspection of the image. A number from 0 to 5 was given to indicate the level of colouring. Values above 3 indicate that the level of colouring in the image was unacceptable.

TABLE 1

| Voltage | DELTA | $t_1$ (ms) | P (W/mm²) | $P_{max}$ (W/mm²) | Colouring |
|---|---|---|---|---|---|
| 14.5 | 0.28 | 16 | 4.464 | 5.999 | 0 |
| 16.0 | 0.28 | 16 | 5.441 | 5.999 | 3 |
| 15.0 | 0.37 | 16 | 6.277 | 6.835 | 3 |
| 16.5 | 0.37 | 16 | 7.533 | 6.835 | 4 |
| 14.5 | 0.45 | 16 | 7.114 | 7.672 | 3 |
| 16.0 | 0.45 | 16 | 8.649 | 7.672 | 4 |
| 14.5 | 0.31 | 20 | 5.022 | 6.277 | 1 |
| 14.5 | 0.36 | 20 | 5.719 | 6.696 | 2 |
| 16.0 | 0.36 | 20 | 6.975 | 6.696 | 4 |
| 14.5 | 0.45 | 20 | 7.254 | 7.672 | 3 |
| 16.0 | 0.45 | 20 | 8.788 | 7.672 | 5 |
| 14.5 | 0.41 | 25 | 6.556 | 7.254 | 2 |
| 15.5 | 0.41 | 25 | 7.533 | 7.254 | 3 |
| 14.0 | 0.47 | 25 | 6.975 | 7.812 | 2 |
| 15.5 | 0.47 | 25 | 8.509 | 7.812 | 4 |
| 14.5 | 0.39 | 30 | 6.138 | 6.975 | 3 |
| 14.5 | 0.47 | 30 | 7.533 | 7.812 | 3 |

Although the invention has been described with respect to preferred embodiments, it is not to be so limited, as changes and modifications can be made within the intended scope of the present invention defined by the appended claims.

Direct thermal imaging can be used for both the production of transparencies and reflection type prints. In the hard copy field recording materials on white opaque base are used, whereas in the medical diagnostic field black imaged transparencies find wide application in inspection techniques operating with a light box.

The present invention clearly can also be applied in the case of coloured images, in the case of which the electrical signals corresponding to the different colour selections are sequentially subjected to typical corresponding transformation lookup tables such that the diagnostic visual perception of the coloured hardcopy reaches an optimum.

We claim:

1. A method for making an image by means of a direct thermal imaging element, comprising on a support a thermosensitive layer incorporating an organic silver salt and further comprising a reducing agent contained in said thermosensitive layer and an outermost anti-frictional or protective layer, said imaging element being imagewise heated by means of a thermal head having energisable heating elements, characterised in that the activation of the heating elements is executed line by line with a line duty cycle Δ representing the ratio of activation time to total line time, such that the following equation is satisfied $$P \leq P_{max} = 3.3 \ W/mm^2 + (9.5 \ W/mm^2 \times \Delta)$$

wherein $P_{max}$ is the maximal value over all heating elements of the time averaged power density P expressed in W/mm² dissipated by a heating element during a line time.

2. A method according to claim 1, characterised in that said activation of the heating elements is executed duty cycled pulsewise, wherein each heating pulse (h) is followed by a cooling time (c).

3. A method according to claim 2, characterised in that the strobeperiod ($t_s$), being the sum of a heating pulse width (h) and a cooling time (c), is changed during activation of the heating elements.

4. A method according to claim 2 or 3, characterized in that the ratio of the heating pulse width (h) to the sum of the heating pulse width (h) and the cooling time (c) following said heating pulse, is changed during the image wise activation of the heating elements, said ratio being called strobe duty cycle $\delta$.

5. A method according to claim 1 or 2, characterised in that the amplitude of the voltage applied to the thermal head is changed during the imagewise activation of the heating elements.

* * * * *